E. B. ESTHER.
SPRING TIRE.
APPLICATION FILED MAR. 10, 1919.
1,306,109.
Patented June 10, 1919.
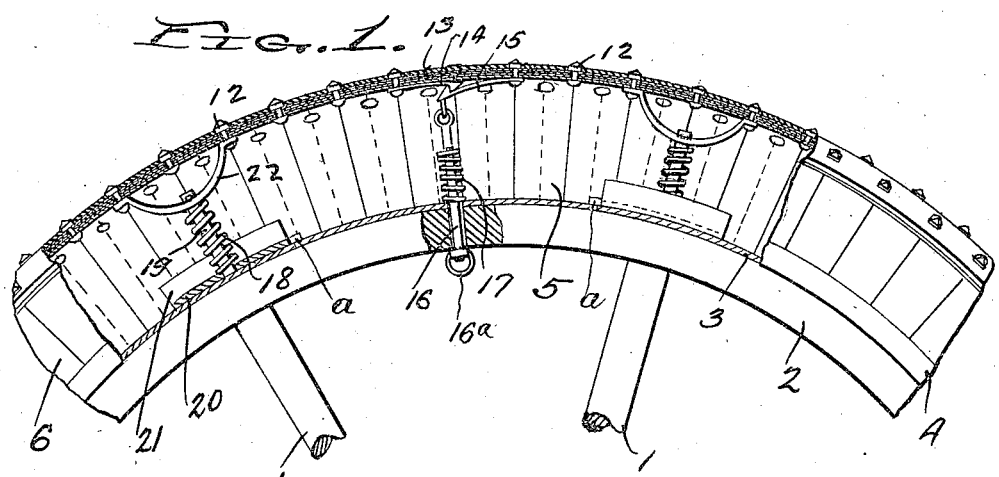
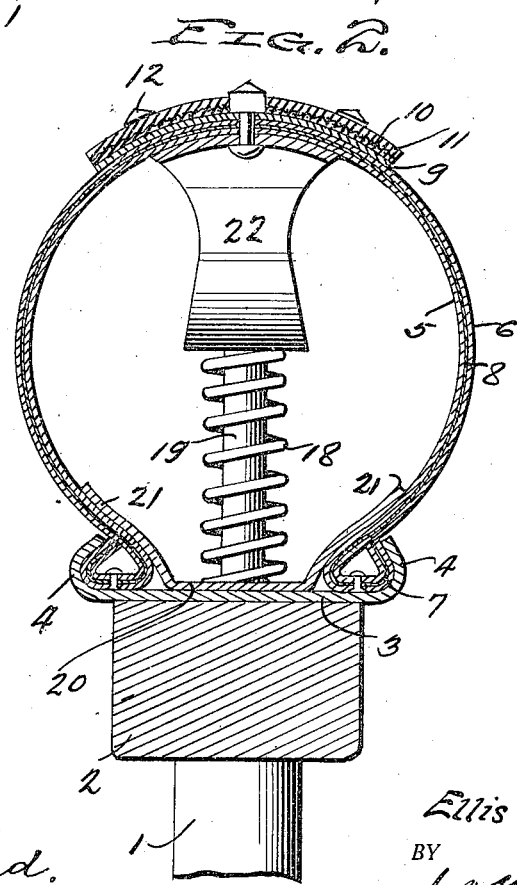
WITNESSES
INVENTOR.
Ellis B. Esther
BY
ATTORNEY.

UNITED STATES PATENT OFFICE.

ELLIS B. ESTHER, OF LEBANON, MISSOURI.

SPRING-TIRE.

1,306,109.             Specification of Letters Patent.      Patented June 10, 1919.

Application filed March 10, 1919. Serial No. 281,607.

*To all whom it may concern:*

Be it known that I, ELLIS B. ESTHER, a citizen of the United States, residing at Lebanon, in the county of Laclede and State of Missouri, have invented certain new and useful Improvements in Spring-Tires, of which the following is a specification.

The invention relates to yieldable tires for motor vehicles, wagons and the like so as to absorb vibration and shock and thereby secure ease and comfort to the rider and prevent injury to the motor and adjunctive parts of a mechanically propelled vehicle.

The invention provides essentially a metal tire to replace the usual pneumatic tire and which possesses resilient qualities but is free from the objectionable features such as puncture and blow-out of a pneumatic tire.

The invention consists of a tire adapted to be fitted to the rim of a vehicle wheel in substantially the same manner as the ordinary pneumatic tire and which embodies a casing made up of a plurality of sections possessing resiliency and which casing is supplemented by inclosed reinforcing springs, the casing being rendered tight to prevent entrance of dust, moisture and the like to the detriment of the inclosed parts.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the drawing,

Figure 1 is a detail view of the outer portion of a vehicle wheel provided with a spring tire embodying the invention.

Fig. 2 is a transverse section showing the parts on a larger scale.

Corresponding and like parts are referred to in the following description and indicated in both views of the drawing by like reference characters.

The fragment of wheel illustrated comprises spokes 1, a felly 2 and a rim 3 which is provided at opposite edges with flanges 4 which are adapted to engage the edges of the tire by a clencher action.

The casing comprises a plurality of sheet metal members or sections of like formation, the members or sections being provided in layers and disposed in overlapping relation to break joint, as indicated most clearly by the full and dotted lines in Fig. 1. As indicated most clearly in Fig. 2 the sections are arranged to form an inner layer 5 and an outer layer 6. The sections of the several layers are secured by suitable fastenings, both at their ends and intermediate of their ends. The ends of the sections are bent to provide beads 7 which correspond to the beads formed at the edges of the ordinary pneumatic shoe or casing so as to interlock with the flanges 4 of the rim 3. A fabric 8 is disposed between the layers 5 and 6 and may be of any suitable material and is designed to exclude dust, moisture and other foreign matter as also to prevent direct contact of the sections comprising the inner and outer layers. The edge portions of the fabric 8 are extended to come between the bent terminal portions of the sections forming the beads 7. The fabric 8 may be of any material and is treated so as to exclude moisture. A band 9 encircles the tread portion of the tire and preferably consists of a strip of steel bent into circular form and transversely curved between its edges to conform to the tread portion of the tire. A wear strip is disposed exterior to the metal 9 and comprises a textile strip 10 imbedded in rubber 11. Fastenings such as rivets 12 connect the several parts and the projecting ends of the fastenings constitute studs which resist wear and prevent slipping. The projecting ends of the rivets or fastenings are pointed and hardened.

The casing is split as indicated at 13 whereby it may be placed in position or removed from the rim of a wheel. Complemental fastening means are secured to opposite end portions of the casing adjacent the split to secure the tire when in position. The fastening means consist of a hook 14 secured to one end of the casing and a latch 15 attached to the opposite end of the casing, the parts 14 and 15 being disposed to engage and secure the ends of the tire when brought together about the rim of the wheel. The fastening means 14 and 15 are located upon the inner side of the tread portion of the tire. A rod 16 extends through an opening formed in the rim of the wheel and its inner end is connected with the latch 15 so that upon drawing upon the outer end of the rod 16 the latch 15 may be disengaged from the hook or companion member 14. An expansible coil spring 17 mounted on the inner end of the rod 16 holds the latter at the limit of its inward movement. The outer end of the rod 16 may be provided with any suitable finger piece 16ª or other element detachably connected thereto to be readily engaged when it is required to operate the rod 16 to effect disengagement of the fastening means whereby the ends of the tire are made secure.

Cushioning means are located within the casing and supplement the spring action of the members or sections comprising the layers thereof. These cushioning means are disposed at regulated intervals and each includes an expansible helical spring 18 and a pin 19 upon which the spring 18 is mounted. A shoe 20 has one end of the pin 19 secured thereto and is disposed against the rim 3. The edge portions 21 of the shoe conform to the edge portions of the casing and exert an outward pressure thereon to hold the beads 7 in engagement with the flanges 4. A bracket 22 is secured to the inner side of the tread portion of the tire and is arched between its ends to provide ample clearance for the outer end of the pin 19 which passes through an opening therein. A spring 18 is confined between the bracket 22 and the shoe 20 and exerts an outward pressure on the bracket, thereby supplementing the spring action of the members comprising the casing in sustaining the load and stress to which the tire is subjected. The cushioning devices are centrally disposed, as indicated most clearly in Fig. 2. The brackets 22 are retained in place by certain fastenings 12.

Stops $a$ are applied to the rim 3 upon opposite sides of the rod 16 to engage the shoes 20 near the ends of the casing to facilitate the proper positioning of the parts and prevent circumferential movement of the casing on the rim.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A spring tire, comprising layers, each formed of a plurality of sections, the sections of one layer being disposed in overlapping relation to break joint with the sections of the other layer and the sections of both layers having their end portions bent to provide beads along the edges of the tire and a fabric inclosed between the layers to exclude foreign matter and prevent direct contact of the elements comprising the layers.

2. In a tire, embodying a casing, cushioning means within the casing comprising brackets disposed against the inner side of the tread portion of the casing, pins having a sliding connection at their outer ends with the brackets and expansible helical springs mounted upon the pins and confined between the brackets and the rim of the wheel.

3. In combination, a wheel rim provided at its edges with flanges, a casing having beads to engage the flanges of the rim, shoes located within the casing and having opposite edge portions engaging the casing to retain the beads thereof in engagement with the flanges of the rim, pins attached to the shoes, brackets disposed against the inner side of the tread portion of the casing and having the outer ends of the pins slidably connected therewith and expansible helical springs mounted on the pins between the shoes and brackets.

4. A tire, comprising a split casing, complemental fastening elements secured to the inner side of the end portions of the casing to fasten the same about a wheel and means extending through the casing and rim and connected with one of the fastening elements to enable disengagement thereof when it is required to remove the tire from the wheel.

In testimony whereof I affix my signature in presence of two witnesses.

ELLIS B. ESTHER.

Witnesses:
R. O. DEFFERDOFFER,
OLIVE REED.